United States Patent [19]

Nakamura

[11] Patent Number: 4,953,589

[45] Date of Patent: Sep. 4, 1990

[54] SEALING DEVICE OF DELIVERY VALVE FOR FUEL INJECTION UNITS

[75] Inventor: Hisashi Nakamura, Higashimatsuyama, Japan

[73] Assignee: Diesel Kiki Co., Ltd., Tokyo, Japan

[21] Appl. No.: 461,078

[22] Filed: Jan. 4, 1990

[30] Foreign Application Priority Data

Feb. 8, 1989 [JP] Japan ............................... 1-13708[U]

[51] Int. Cl.5 ............................................. F16K 15/06

[52] U.S. Cl. ............................................... 137/543.23

[58] Field of Search .................... 137/543.21; 123/495; 239/91

[56] References Cited

U.S. PATENT DOCUMENTS 2,792,846 5/1957 Grieshaber ...................... 137/543.23

*Primary Examiner*—Robert G. Nilson

*Attorney, Agent, or Firm*—Charles S. McGuire

[57] ABSTRACT

A sealing device of a delivery valve having a valve holder accommodating a valve body, and a valve seat fitted into an opening of the valve holder. The end portion of the valve holder has an end face thereof formed with an annular radially outer slant face moderately slanting with respect to an open end plane perpendicular to an axis of the valve holder, and an annular radially inner vertical face extending continuously from the annular radially outer slant face along a plane perpendicular to the open end plane, thereby ensuring positive sealing between the valve holder and the valve seat.

5 Claims, 3 Drawing Sheets

SEALING DEVICE OF DELIVERY VALVE FOR FUEL INJECTION UNITS

BACKGROUND OF THE INVENTION

This invention relates to a sealing device of a fuel injection unit which provides improved sealing between component parts of the unit.

A conventional fuel injection unit for internal combustion engines is provided with a delivery valve as shown in FIG. 1, which comprises a valve body A, a delivery valve holder B in which the delivery valve A is accommodated, and a valve seat C fitted into an open end of the valve holder B in an airtight manner, as is known e.g. from Japanese Provisional Patent Publication (Kokai) No. 57-183561. A coiled spring E is provided within a valve-receiving bore D formed in the valve holder B and urges the valve body A so that the valve body A is axially moved by pressurized fuel from a pump section, not shown, against the force of the spring E.

According to the known fuel injection unit, as shown in FIG. 2, an open end face of an end portion Ba of the valve holder B opposed to a flanged portion Ca of the valve seat C has a radially outer slant face Ba1 moderately outwardly Slanting at an angle of approximately 15 degrees with respect to a plane F defined by the open end face of the valve holder B, in order to improve the sealability between the valve holder B and the valve seat C.

However, during operation of the fuel injection unit, when air bubbles are developed due to a certain factor in fuel oil within a fuel chamber, not shown, of the pump section, and carried by fuel oil into the interior of the valve holder B, they are moved to the end portion Ba of the valve holder B which is in contact with the valve seat C.

However, a radially inner slant face Ba2 is formed on the open end face of the end portion Ba of the valve holder B and moderately inwardly slanting at an angle of approximately 15 degrees with respect to the open end plane F of the valve holder B. Since the angle of the radially inner slant face Ba2 relative to the open end plane F is small, the air bubbles moved to the open end portion Ba are apt to be caught and collect in a gap between the radially inner slant face Ba2 and the opposed face of the flanged portion Ca of the valve seat C. As a result, when the collected air bubbles break, there takes place so-called cavitation erosion in the radially inner slant face Ba2 and the opposed face of the flanged portion Ca of the valve seat C, which causes degraded sealing between the valve holder B and the valve seat C.

SUMMARY OF THE INVENTION

It is the object of the invention to provide a sealing device of a fuel injection unit which is capable of preventing degraded sealing between a delivery valve holder and a valve seat due to cavitation erosion caused by breakage of air bubbles entrained into the delivery valve holder.

To attain the object, the present invention provides a sealing device of a delivery valve of a fuel oil injection unit for use in an internal combustion engine, the delivery valve including a valve body, a valve holder having a valve bore formed therein and accommodating the valve body, and an end portion defining therein an opening of the valve bore, a valve seat fitted into the opening of the end portion of the valve holder in an airtight manner, the valve seat having an axial through bore formed therethrough and slidably receiving the valve body, and a coiled spring received within the valve bore of the valve holder and urging the valve body toward the valve seat.

The sealing device according to the present invention is characterised by the improvement wherein the end portion of the valve holder has an end face thereof formed with an annular radially outer slant face moderately slanting with respect to an open end plane perpendicular to an axis of the valve holder, and an annular radially inner vertical face extending continuously from the annular radially outer slant face along a plane perpendicular to the open end plane.

Preferably, the valve seat may have an annular radially flanged portion formed at one end thereof, the end face of the end portion of the valve holder abutting against the flanged portion.

More preferably, the end portion of the valve holder may includes an annular face formed on the end face of the end portion of the valve holder and radially inwardly extending from the annular radially inner vertical face in a manner parallel to the open end plane.

The annular radially outer slant face may slant with respect to the open end plane at an angle of approximately 15 degrees.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
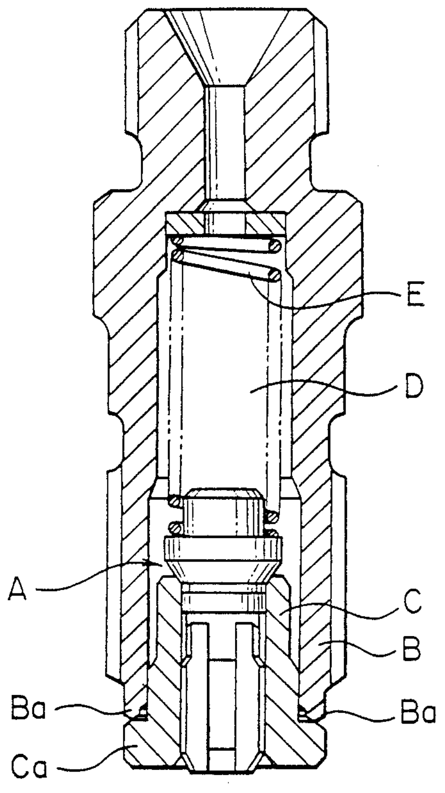
FIG. 1 PRIOR ART
FIG. 1 is a longitudinal cross-sectional view of a delivery valve of a conventional fuel injection unit.
Figure 2:
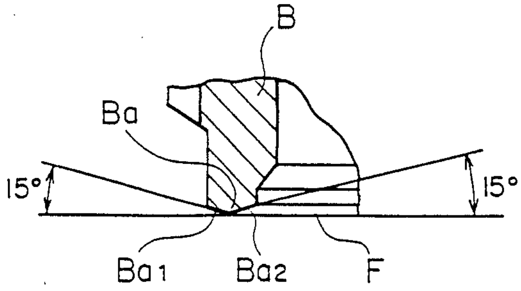
FIG. 2 PRIOR ART
FIG. 2 is an enlarged fragmentary sectional view of an essential part of the delivery valve of FIG. 1.
Figure 3:
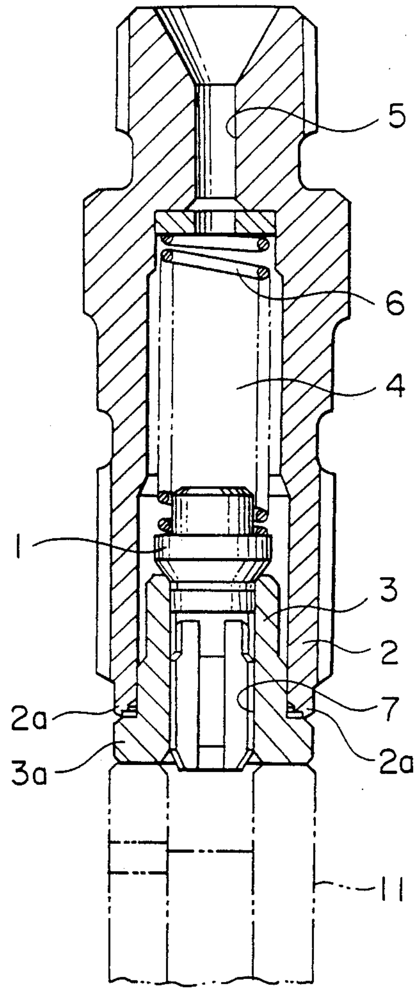
FIG. 3 is a longitudinal cross-sectional view of a delivery valve section of a fuel injection unit according to an embodiment of the present invention.

FIG. 3 shows a deliverY valve of a fuel injection unit having a sealing device. The delivery valve comprises a valve body 1, a valve seat 3 having an annular radially flanged portion 3a formed at one end thereof and an axial through bore 7 formed therethrough and slidably receiving the valve body 1, and a delivery valve holder 2 having a valve-accommodating bore 4 formed therein and having an open end into which the valve seat 3 is rigidly fitted in an airtight manner with the flanged portion 3*a* abutting on a lower end of the delivery valve holder 2. An axial passage 5 is formed in the valve holder 2 in communication with the valve-accommodating bore 4, which is to be connected to an injection pipe, not shown, leading to a fuel injection nozzle, not shown. A coiled spring 6 is received within the valve-accommodating bore 4 and urges the valve body 1 toward the valve seat 3.

Figure 5:
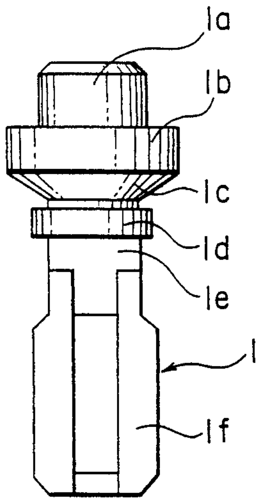
FIG. 5 is a side view of a delivery valve body of the delivery valve of FIG. 3.
Figure 6:
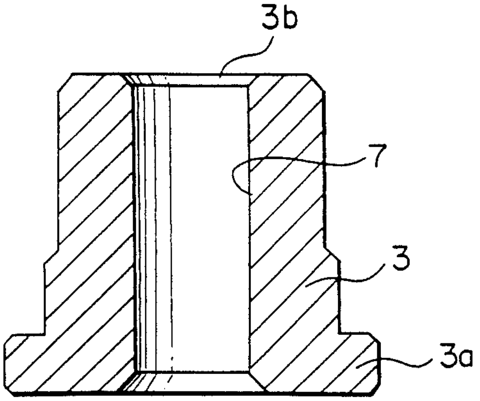
FIG. 6 is a longitudinal cross-sectional view of a valve seat of the delivery valve of FIG. 3.

As shown in FIG. 5, the valve body 1 has an end portion 1a on which one end of the coiled spring 6 is fitted, a spring seating-portion 1b on which the end of the coiled spring 6 abuts, a tapered portion 1c at which the valve body 1 is seated on a valve seating face 3b (FIG. 6) of the valve seat 3, a piston 1d slidably received in the axial through bore 7 of the valve seat 3, a valve stem 1e having a plurality of axial grooves 1f formed therein at circumferentially equal intervals for guiding fuel oil therealong.

Figure 4:
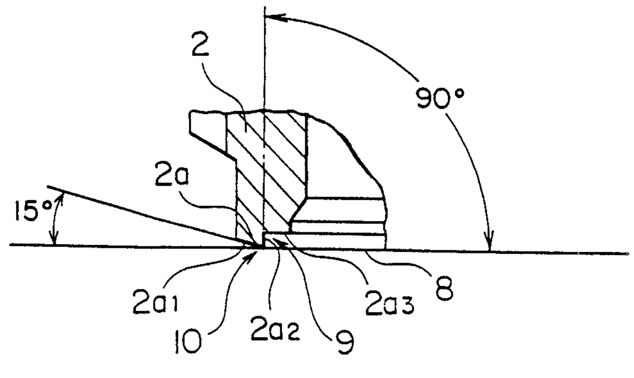
FIG. 4 is an enlarged fragmentary sectional view of an essential part of the delivery valve of FIG. 3.

As shown in FIG. 4, the valve holder 2 has an end portion 2a, which is in contact with the valve seat 3 and has an annular radially outer slant face 2a1 formed on an end face of the end portion 2a and moderately slanting with respect to a plane 8 defined by the open end face of the valve holder 2, which is perpendicular to the axis of the delivery valve, similarly to the slanted face Ba1. In the present embodiment, the slanting angle of the radially outer slant face 2al with respect to the open end plane 8 is 15 degrees. On the other hand, the end face of the end portion 2a has formed therein an annular radially inner vertiCal face 2a2 which axially extends continuously from the radially outer slant face 2a1 along a plane perpendicular to the open end plane 8, and an annular bottom face 2a3 parallel to the open end plane 8, radially inwardly extending from the face 2a2. In the present embodiment, the angle of the annular radially inner face 2a2 with respect to the open end plane 8 is 90 degrees. However, the angle is not limited exactly tO 90 degrees, but may be nearly 90 degrees.

In operation of the delivery valve constructed as above, pressurized fuel oil is supplied from a fuel oil chamber of a pump section 9 through the grooves 1f of the valve body 1 within the axial through bore 7 of the valve seat 3, and exerts pressure on the valve body 1 in a valve-opening direction against the force of the coiled spring 6. When the pressure of fuel oil overcomes the force of the coiled spring 6, the valve body 1 is lifted so that the tapered portion 1c of the valve body 1 leaves the seating face 3b of the valve seat 3 and simultaneously the piston 1b slides out of the axial through bore 7 to allow fuel oil to pass through a gap between the tapered portion 1c and the seating face 3b, and then through the valve-accommodating bore 4 and the axial passage 5 of the valve holder 2, to be delivered into the injection pipe.

After the fuel oil injection stroke is completed, the pressure of fuel oil acting on the valve body 1 in the valve-opening direction is surpassed by the sum of the residual pressure of the fuel oil within the valve-accommodating bore 4 and the force of the coiled spring 6. Accordingly, the valve body 1 is seated on the valve seat 3 in such a manner that the piston 1d returns into the through bore 7 to bring the valve-accommodating bore 4 out of communication with the through bore 7 and hence the fuel oil chamber, and then the tapered portion 1c is brought into pressure contact with the seating face 3b of the valve seat 3, thereby closing the delivery valve.

During the operation of the delivery valve, when air bubbles are developed due to a certain factor in fuel oil within the fuel oil chamber and carried by fuel oil into the interior of the valve holder 2, they are apt to collect in a space at the corner 9 defined by the radially inner vertical face 2a2 and the horizontal bottom surface 2a3 of the end portion 2a of the valve holder 2. However, the corner 9 is located distantly from a contact point 10 between the end portion 2a of the valve holder 2 and the flanged portion 3a of the valve seat 3, so that even if the collected air bubbles in the corner 9 break to cause cavitation erosion in the corner 9, there is no possibility of degraded sealing at the contact point between the valve holder 2 and the valve seat 3.

Further, the end portion 2a of the valve holder 2 formed as above has some elasticity such that when the delivery valve holder 2 is acted upon by the pressure of pressurized fuel oil in a direction away from the valve seat 3, the end portion 2a is elastically deformed tO prevent fuel oil from leaking through the gap between the valve holder 2 and the valve seat 3.

Incidentally, the radially inner vertical face 2a2 has preferably an axial length within a range of 0.8 to 1.0 mm.

What is claimed is:

1. In a sealing device of a delivery valve of a fuel oil injection unit for use in an internal combustion engine, said delivery valve including a valve body, a valve holder having a valve bore formed therein and accommodating said valve body, and an end portion defining therein an opening of said valve bore, a valve seat fitted into said opening of said end portion of said valve hOlder in an airtight manner, said valve seat having an axial through bore formed therethrough and slidably receiving said valve body, and a coiled spring received within said valve bore of said valve holder and urging said valve body toward said valve seat, the improvement wherein said end portion of said valve holder has an end face thereof formed with an annular radially outer slant face moderately slanting with respect to an open end plane perpendicular to an axis of said valve holder, and an annular radially inner vertical face extending continuously from said annular radially outer slant face along a plane perpendicular to said open end plane.

2. A sealing device as claimed in claim 1, wherein said valve seat has an annular radially flanged portion formed at one end thereof, said end face of said end portion of said valve holder abutting against said flanged portion.

3. A sealing device as claimed in claim 1, including an annular face formed on said end face of said end portion of said valve holder and radially inwardly extending from said annular radially inner vertical face in a manner parallel to said open end plane.

4. A sealing device as claimed in claim 2, wherein said annular radially outer slant face slants with respect to said open end plane at an angle of approximately 15 degrees.

5. A sealing device as claimed in claim 1, wherein said annular radially inner vertical face has an axial length within a range of 0.8 to 1.0 mm.

* * * * *